United States Patent [19]

Fairman et al.

[11] Patent Number: 4,891,752
[45] Date of Patent: Jan. 2, 1990

[54] MULTIMODE EXPANDED MEMORY SPACE ADDRESSING SYSTEM USING INDEPENDENTLY GENERATED DMA CHANNEL SELECTION AND DMA PAGE ADDRESS SIGNALS

[75] Inventors: Bruce A. Fairman, Woodside; Allen J. Larsen, Campbell; William G. Swinton; Robert G. Taylor, Jr., both of Santa Cruz, all of Calif.

[73] Assignee: Tandon Corporation, Moorpark, Calif.

[21] Appl. No.: 20,964

[22] Filed: Mar. 3, 1987

[51] Int. Cl.⁴ ............... G06F 12/00; G06F 12/02; G06F 12/06; G06F 12/10
[52] U.S. Cl. ............... 364/200; 364/238.3; 364/242.3; 364/242.33; 364/245; 364/245.31; 364/256.3; 364/256.5
[58] Field of Search ... 364/200 MS File, 900 MS File

[56] References Cited

U.S. PATENT DOCUMENTS

| | | | |
|---|---|---|---|
| 3,854,126 | 12/1974 | Gray et al. | 364/200 |
| 3,970,999 | 7/1976 | Elward | 340/172.5 |
| 4,158,227 | 6/1979 | Baxter et al. | 364/200 |
| 4,164,786 | 8/1979 | Gollomp | 364/200 |
| 4,340,932 | 7/1982 | Bakula et al. | 364/200 |
| 4,383,296 | 5/1983 | Sander | 364/200 |
| 4,386,402 | 5/1983 | Joy | 364/200 |
| 4,403,282 | 9/1983 | Holberger et al. | 364/200 |
| 4,403,283 | 9/1983 | Myntti et al. | 364/200 |
| 4,407,016 | 9/1983 | Bayliss et al. | 364/200 |
| 4,419,727 | 12/1983 | Holtey et al. | 364/200 |
| 4,449,181 | 5/1984 | Young et al. | 364/200 |
| 4,449,184 | 5/1984 | Pohlman, III et al. | 364/200 |
| 4,550,368 | 10/1985 | Bechtolsheim | 364/200 |
| 4,669,043 | 5/1987 | Kaplinsky | 364/200 |
| 4,669,064 | 5/1987 | Ishimoto | 365/189 |
| 4,675,850 | 7/1987 | Kumanoya et al. | 365/230 |
| 4,688,166 | 8/1987 | Schneider | 364/200 |
| 4,697,106 | 9/1987 | Watanabe | 307/463 |
| 4,740,922 | 4/1988 | Ogawa | 365/189 |

FOREIGN PATENT DOCUMENTS 55-44613 3/1980 Japan.

OTHER PUBLICATIONS

IBM Technical Disclosure Bulletin, vol. 25, No. 7B, Dec. 1982, p. 3865.
Technical Reference Manual-IMB PC AT (Mar. 1984), pp. i-xv, 1-1 to 1-82.
VICTOR VI Memory Mapper System Interface Description (1985) by NNA Corporation.
Expanded Memory Device Specification (3.0).
Specification For An Expanded Memory Device, Interface Product Version 1.0.

Primary Examiner—Archie E. Williams, Jr.
Assistant Examiner—Robert B. Harrell
Attorney, Agent, or Firm—Scherlacher, Mok & Roth

[57] ABSTRACT

A computer system includes a computer address modification system that is advantageously coupled in a bus network to selectively translate memory address data in 16K blocks and provide DMA page addresses which may match the 16K memory address blocks. The modification system includes a mapping RAM selectively providing translated addresses to enable addresses in a 1 megabyte address space to be selectively mapped to a 16 megabyte extended address space. The modification system also includes a page register storing for each addressable 16K block of data for each DMA channel a page address within the extended address space.

3 Claims, 13 Drawing Sheets

PAGE REG

MULTIMODE EXPANDED MEMORY SPACE ADDRESSING SYSTEM USING INDEPENDENTLY GENERATED DMA CHANNEL SELECTION AND DMA PAGE ADDRESS SIGNALS

BACKGROUND OF THE INVENTION

A designer of a data processing system or computer has typically had to accept a design compromise when selecting the maximum physical address space for the system. If a large address space is selected, the cost of the system is increased. Not only must the number of physical wires, drivers, connectors and related components be increased, but the address data size and storage requirements increase as well. For example, a 32 bit address requires twice the storage space of a 16 bit address. However, if the address space of a system is too limited, system performance will be degraded for complex operations which require quick access to a large amount of memory.

One solution to this problem has been to implement memory mapping or paging. In such an arrangement, a mapping memory or paging memory stores the most significant address bits for an expanded address space. For example, a system having a 20 bit address bus that can address 1 megabyte of memory might be used with a mapping memory that provides an additional 4 bits of addressing to accommodate a 16 megabyte address space. Certain locations in the original memory of I/O address space of the computer are reserved for accessing the mapping memory so that the stored most significant 4 address bits can be selectively changed. Once these bits are selected and written into the mapping memory, the computer can use its original address lines to address any location within a page or subset of the expanded memory that is defined by the most significant address bits stored in the mapping memory.

To increase the resolution of the page definitions the mapping memory can also store less significant address bits that overlap the original computer address bits. Typically, the overlapping mapper and computer address bits are added together to obtain the final extended memory space address.

The popular INTEL 8088 and 8086 microprocessors essentially use this technique. Each 20 bit output address is a sum of a 16 bit offset address and a 16 bit segment address that is shifted left 4 positions relative to the offset address. This enables most instructions to refer to one of 64K memory locations within a segment using a 16 bit offset address. At the same time, the segment boundaries can be changed by providing an additional 16 bit segment address to increase the total address space to one megabyte anytime it becomes necessary.

A more recent INTEL 80286 microprocessor is operable in a real mode which emulates the INTEL 8086 microprocessor or a protected mode which extends the address space from 1 megabyte to 16 megabytes. While price decreases for memory chips and increasing software complexity make it desirable to use the increased memory capacity, the protected mode in which the increased capacity is available is not compatible with the prior microprocessors. Software manufacturers have thus largely written software for the real mode to attain compatibility with the prior machines and maximize the available market size for their products. The extended memory capacity is generally used only for specialized applications such as a RAM disk which uses memory to simulate a disk drive.

The address modification system of the present invention provides memory access conversion functions which provide a window to an expanded memory space while operating in a real mode or a mode that is compatible therewith. The system provides a full function availability of the extended memory space, not only for memory word accesses, but for direct memory access (DMA 4) operations while retaining full compatibility with hardware interrupt processing.

SUMMARY OF THE INVENTION

A computer system in accordance with the invention includes a CPU, a bus controller, an I/O controller, a computer address modification system and I/O devices such as DMA controllers and interrupt controllers. An adaptive bus network converts the modification system within the computer system.

The modification system includes a mapper RAM, a page register and a control register which selectively enables the modification system and various modes of operation for the system. A 41 register page register provides selective page addressing for each possible 16K block of each DMA transfer channel.

BRIEF DESCRIPTION OF THE DRAWINGS

A better understanding of the invention may be had from a consideration of the following Detailed Description, taken in conjunction with the accompanying drawings in which.

DETAILED DESCRIPTION

Figure 1:
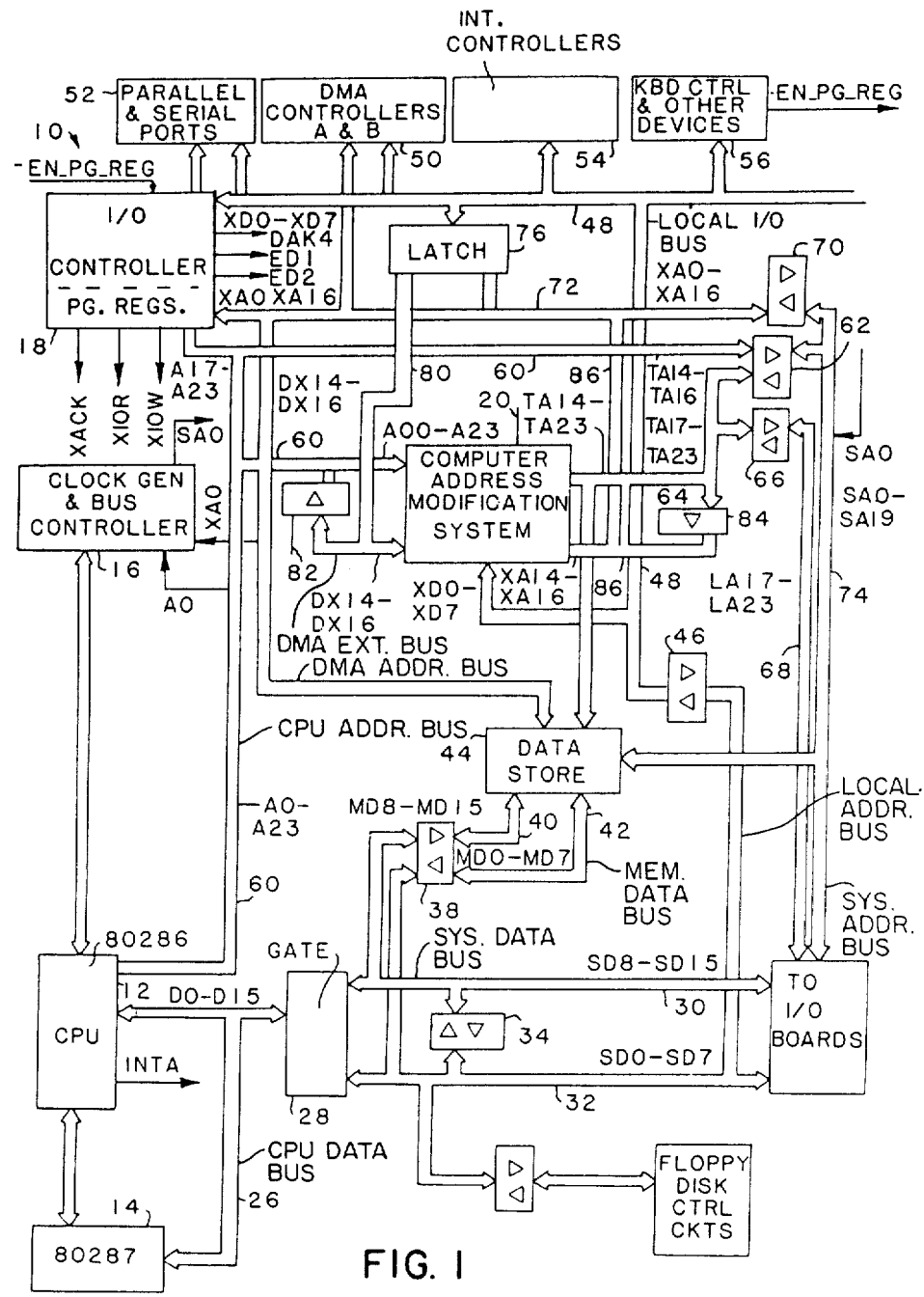
FIG. 1 is a block diagram representation of a computer system in accordance with the invention having a computer address modification system.

Referring now to FIG. 1, a computer system 10 in accordance with the invention is designed to provide compatibility with a popular PC AT computer system manufactured by International Business Machines, Incorporated. The computer system 10 includes an 80286 central processing unit 12, an 80287 math coprocessor 14 made by INTEL, a clock generator and bus controller 16, and an I/O controller 18.

Clock generator and bus controller 16 provides a nominal 8 MHz clock signal as well as numerous gating signals for enabling bus transfers within system 10. The detailed timing and control implementations of the system 10 are conventional. Thus, to facilitate understanding, only the significant data and address signal paths are shown in FIG. 1. However, the required control and gating signals should be implemented in a conventional manner to provide proper system operation.

Similarly the detailed circuitry and associated control and gating signals of I/O controller 18 have not been shown. These can be implemented in a conventional manner to provide proper input/output data transfers.

The INTEL 80286 CPU 12 is operable in either a real mode or a protected mode. In real mode CPU 12 emulates an INTEL CPU 8086 and has an address space of 1 megabyte with the space above 640 kilobytes being reserved for ROM BIOS, video buffers and other system functions.

In protected mode the address space is increased to 16 megabytes but CPU 12 can no longer execute most software written for for the 8086 and similar CPU's. To date it has thus been difficult to utilize the extended memory space except for a few specialized applications such as RAM disks which simulate actual disk drives while providing the speed of RAM.

The system 10 therefore includes a computer address modification system 20 which receives system addresses in the 1 megabyte address space and selectively translates these addresses in 16 kilobyte blocks to a 16 megabyte address space. The translation is transparent to operating programs and therefore maintains compatibility with programs written for the older CPU's. Modification system 20 provides for selective translation of DMA (direct memory address) operations in 16K blocks and selectively inhibits memory mapping upon processing a response routine for a nonmaskable interrupt (NMI) or a maskable interrupt. At turn on, system 20 operates in a clone mode in which a conventional real mode for the 80286 CPU 12 is implemented. However, by using conventional CPU I/O operations to write data into predetermined port locations, the modification system 20 can be operated in a mapping mode in which both CPU 20 memory accesses and DMA accesses are selectively transferred in 16K blocks from an address in 1 megabyte memory space to an address in 16 megabyte memory space on a 16K boundary.

Looking first at the system 10 data paths, the 16 bit CPU data bus 26 couples through a gate 28 to two upper and lower 8 bit system data buses, SD8-SD15 30 and SD0-SD7 32. A gate 34 allows data to be selectively transferred between the upper and lower data buses 30,32.

A gate 38 couples the system data buses 30, 32 to corresponding memory data buses MD8-15 40 and MD0-7 42. Memory data buses 40, 42 in turn couple to a data store 44 which includes in a conventional manner, random access memory in the 0-640K memory space, BIOS ROM, and extended RAM in the extended 1M to 16M memory space.

System data bus 32 also couples through a gate 46 to a local I/O bus XD0-XD7 48 which connects to system 10 I/O devices including DMA controllers 50. Other devices connected to local I/O bus 48 may include parallel and serial ports 52, interrupt controllers 54 providing 7 levels of interrupt plus a nonmaskable interrupt, and a keyboard controller 56. Other devices such as a timer, or a real time clock may also be connected to the local I/O bus 48.

A CPU address bus A0-A23 60 couples to modification system 20 while the signal lines for lower order bits A0-A13 further couple to a gate 62. These lower bits define an address within a 16K block. Since address translation occurs in 16K blocks, these bits are not required to accomplish address modification and they can be coupled directly to gate 62.

Modification system 20 produces translated address portions in a translation address bus TA14-TA23 64 which couples to gate 62 as well as a gate 66. Gate 66 provides communication with a local address bus LA1-7-LA23 68 which provides communication with optimal I/O system expansion boards.

Gate 62 provides communication with a system address bus SA0-SA19 74 which also couples to the I/O boards and through a gate 70 to a DMA address bus XA0-XA16 72. Signal SA0 ia communicated from CPU address bus 60 signal A0 through bus controller 16 so that it can be adjusted to accommodate swapping of a data byte between the upper and lower portions of the system data buses 30, 32.

Address positions XA14-XA16 must be handled specially because there are two types of DMA transfer operations. DMA channels 0, 1, 2 and 3 are byte channels that can access 64K byes of data. Address bits 14 and 15 thus define 1 of 4 16K blocks within this space. DMA channels 4, 5 and 6 are word (2 bytes) channels and can access 128K bytes of data. Address bits 14, 15 and 16 then define one of 8 16K blocks within the available address of space.

A latch 76 receives data from local I/O data bus 48 and couples to DMA address bus 72. Latch 76 also couples data bus 48 to a DMA extension bus DX14-DX16 80 which communicates DMA address data bits DX14-DX16 to modification system 20. A gate 82 selectively transfers address bits DX14-DX16 to CPU address lines A14-A16 for input to modification system 20. A gate 84 then transfers translated address signals TA14-TA16 back down to signal paths XA14-XA16 to be used as a DMA address on bus 86 which is an extension of DMA address bus 72.

In clone mode all addresses are passed through modification system 20 without change and the system operates as a conventional 80286 processing system. However, once modification system 20 is switched to a mapping mode memory addresses are selectively translated in 16K blocks to any selected location in 16 megabyte memory space. Each different 16K block within the first megabyte may be individually translated to a different location. If the CPU operates in protected mode and asserts a CPU address above 1 megabyte, translation is automatically disabled. The modification system may be controlled to selectively disable mapping while the CPU processes an interrupt response routine. Separate paging is provided for each 16K block for each different DMA channel. Individual paging for each 16K block may be selectively enabled or disabled for each DMA channel.

When the CPU accesses memory in clone (no translation) mode CPU address bus 60 carries bits A0-A13 through gate 62 to system address bus 74 and then to data store 44. The upper address bits A14-A24 pass through modification system 20 unchanged. They are output on translated address bus 64 for communication through gate 62 and system address bus 74 to data store 44. If mapper mode is enabled the address data path is essentially the same except that modification system 20 selectively changes address bus signals A14-A24.

When system control is granted to a DMA controller 50 I/O controller 18 generates signal-XACK and couples the DMA address from DMA address bus XA0-XA16 72 through gate 70 to system address bus 74. Bits DX14-DX16 are input directly to modification system 20 through bus 80 while its AX1-AX13 are coupled through gate 70 to system address bus 74. The selectively modified address bits 14-16 are output on bus XA14-XA16 86 which connects to corresponding signals XA14-XA16 on bus 72. Address data is then coupled through gate 70 and system address bus 74 to data store 44.

Upon the occurrence of an interrupt an interrupt controller 54 places a vector type which define an interrupt response vector address, onto the DMA data bus XD0–XD7. This vector type is then communicated to modification system 20 where it is stored. It is also made available to the CPU 12 through gate 46, system data 32 and CPU data bus 26. When CPU 12 responds to the interrupt request it places the vector type address on the CPU address bus 60. When this bus input matches the selector previously stored by modification system 20, translation of the interrupt vector type address is inhibited if this has been previously commanded. This enables interrupt vectors to be limited to the traditional location in the first kilobyte of physical memory space even if address translation has been enabled.

Figure 2:
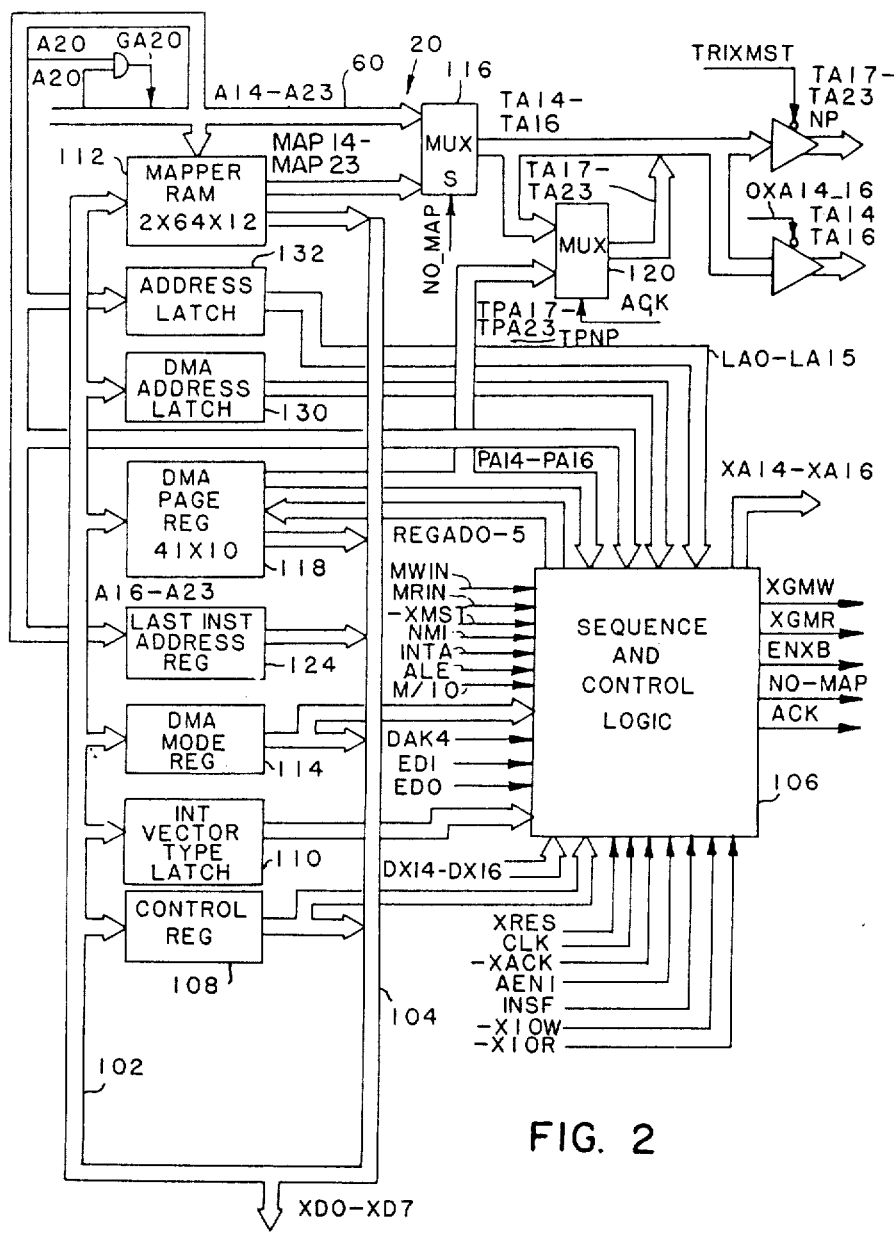
FIG. 2 is a block diagram of a computer address modification system used in the computer system shown in FIG. 1.
Figure 3:
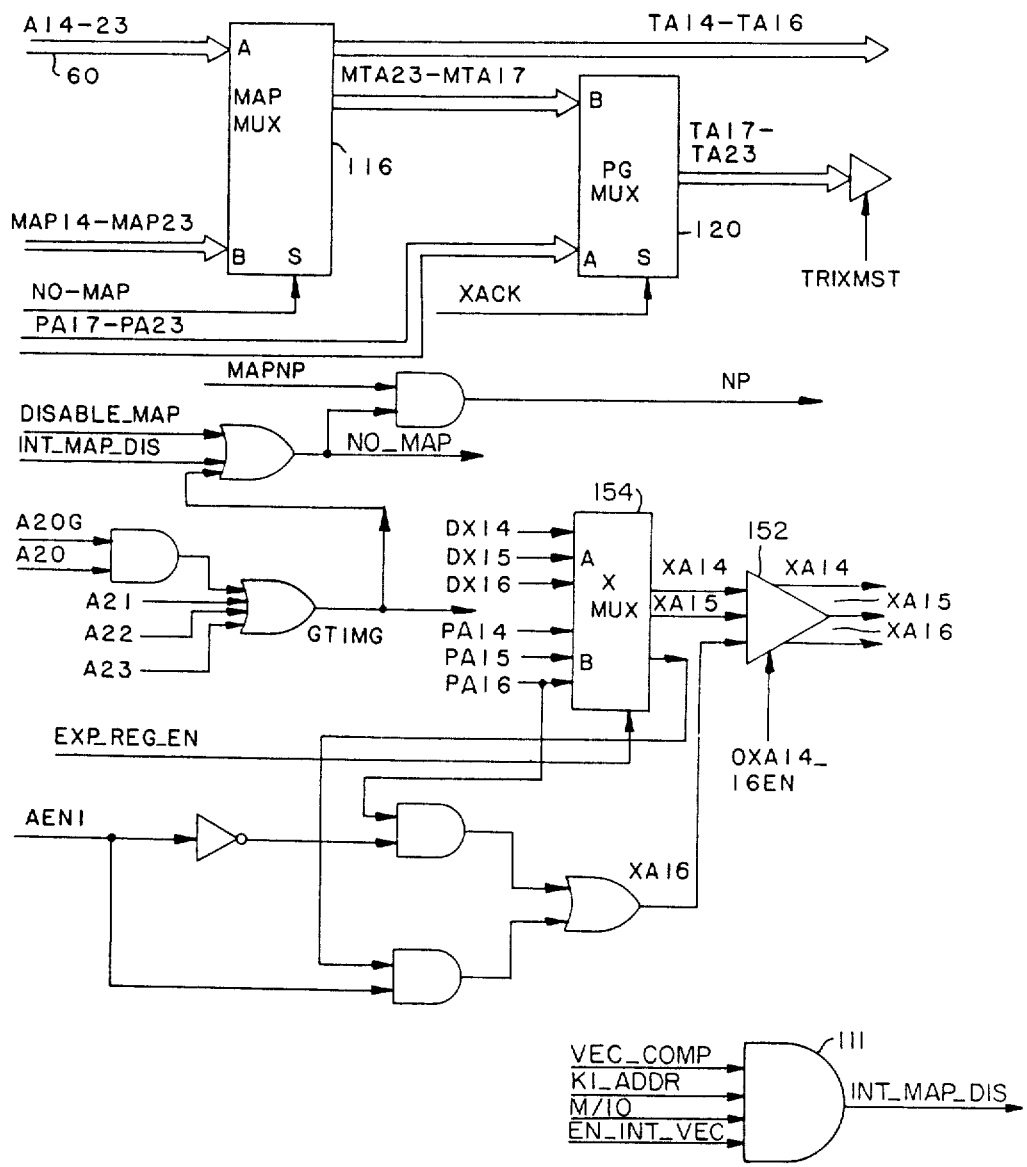
FIG. 3 is a block diagram showing in greater detail an output portion of the computer address modification system shown in FIG. 2.

Referring now to FIGS. 2 and 3, the computer address modification system 20 receive and outputs data through an input data bus 102 and an output data bus 104 which have a tri-state connection to signals XD0–XD7 on data bus 48. It will be appreciated that only the significant signal paths are shown in FIG. 2. Conventional encoding, decoding and gating for data transfers and loading of registers, flip-flops and memory cells are handled through signals generated by conventional circuits within sequence and control logic 106. These conventional signals and circuits have not been explicitly shown since they would unnecessarily complicate the drawings and description without adding to the understanding of the invention.

A read-write control register 108 is coupled between the input and output data buses 102, 104 and stores data providing master control over modification circuit 20. Central register 108 is located at port 410H in I/O space. Bit 5 is always read as a zero. Writing a one to bit 5 has the effect of resetting the function of detecting an interrupt vector operation during response to an interrupt request. Bits 6 and 7 are not used.

Bit 0 selectively enables or disables address translation by the modification system 20. A zero disables translation while a one enables translation. Bit 1 is a write protect bit for a mapper RAM 112. A zero write protects the RAM while a one enables writing. A zero at bit position two disables interrupt revectoring (enabling translation) while a one enables interrupt revectoring so that interrupt addresses are not translated in the same manner as other addresses. A zero at bit 3 activates or addresses a lower set of 64 storage locations in mapper RAM 112 while a one activates an upper group of 64 addresses in mapper RAM 112.

Bit position 4 enables read-write accesses to data store 44 at addresses above 1 megabyte when set to zero. If set to one the system memory read and write signals are blocked from data store 44 and from the I/O boards if address signals A20–A23 on bus 60 are not zero. A hardware reset sets the control register to 00H.

The CPU 12 responds to an interrupt request from interrupt controllers 54 by generating two pulses on signal line interrupt acknowledge, INTA. Upon the occurrence of the second pulse interrupt controllers 54 place on the local I/O data bus XD0–XD7 48 a vector type which identifies the starting location in data store 44 at which a vector pointing to the interrupt response routine is stored. The CPU 12 reads in the vector type and transfers it to address lines 2–9 to read a 4 byte vector beginning at the indicated vector type memory location.

A vector type latch enable flip-flop within sequence and control logic is set at each occurrence of the signal pulse INTA. An 8 bit interrupt vector type latch 110 also latches the contents of input data bus 102. At the second occurrence the proper vector type data is stored in interrupt vector type latch 110.

Thereafter, whenever CPU 12 asserts an address, sequence and control logic 106 compares the address to the latched vector type value. A signal VEC_COMP (FIG. 3) is generated to indicate that CPU 12 is accessing an interrupt vector any time CPU 12 produces an address which matches the latched vector type value while the vector type latch enable flip-flop is set or any time the input signal NMI (nonmaskable interrupt) is asserted while the CPU address indicates the standard NMI vector memory location 8-BH.

A signal INT_MAP_DIS (FIG. 37) is then generated to disable mapping when signal VEC_COMP is true and an address location within the first 1 K bytes of memory is being accessed (signal K1_ADDR is true) and bit position 2 of the control register 108 (EN_INT_VEC) is set to one and input signal M/IO indicates that a memory access cycle is in progress. A signal NO_MAP is then generated to command a multiplexer 116 to pass data from the input address bus 60 rather than from mapper RAM 112 whenever signal INT_MAP_DIS is asserted or one of the address lines A20–A23 is active to indicate an address above 1 meg. or a signal DISABLE_MAP is active. Signal DISABLE_MAP is generated whenever bit 0 of the control register 108 is set to zero or signal M/IO indicates that an input output operation is in progress.

A two part procedure is thus used to detect the processing of an interrupt vector by the CPU 12. First an interrupt enable condition must be established by either the assertion of two pulses in signal INTA or by assertion of the nonmaskable interrupt signal NMI. Next, the CPU 12 must access an address location corresponding to the latched vector type data for a maskable interrupt or else one of the locations 8-BH for a nonmaskable interrupt. The interrupt enable condition is terminated normally by an interrupt response routine, by writing a one into bit 5 of the control register 108 to reset the interrupt enable flip-flop or by a system reset signal. Nonmaskable interrupt detection is disabled when signal NMI is no longer asserted.

A DMA mode register 114 is an 8 bit read write register located at address 420H in I/O space. Bit positions 0–6 correspond respectively to DMA channels 0–3 and 5–7. A zero in a given bit position causes the corresponding DMA channel to be operated in special clone mode (no translation) while a one indicates extended mode (translation enabled) in which a DMA page register 118 provides the 10 most significant address bits XA14–XA16 and TA17–TA23 to access a 16K block of data in extended memory space. Mode register 114 is reset to 00H in response to a hardware system reset signal.

The DMA page register 118 is made operable to generate DMA addresses by generating within sequence and control logic 106 a signal ACK which controls a page multiplexer 120. Signal ACK is generated as an inversion of input signal-XACK which is generated by bus controller 16 anytime a DMA transfer is in operation and signal -EN_PG_REG from keyboard controller 56 is active low.

A last instruction address register 124 stores the 8 most significant bits A16–A23 of each instruction fetch memory access in response to an instruction fetch input signal INSF. Register 124 is not used in the present application, but its contents can be read at I/O port 450H.

The DMA page register is actually implemented as a 64×10 addressable RAM but only 41 registers are actually used. Sixteen registers are used to provide four page registers for each of the 4 byte wide DMA channels 0-3 and 24 registers are used to provide 8 page registers for each of the three DMA word channels 5-7. Refresh is constrained to clone mode so it uses only a single channel.

A writeable DMA page address latch 130 appears at address port 430H in I/O space and communicates a latched address to sequence and control logic 106. A multiplexer selectively connects the 6 bit address input for the page RAM to the DMA page register address latch 130 or to the DMA address selection signals. The 41 registers of page register 118 are thus read or written by first writing the I/O space address of the desired register into the DMA page address latch 130 at port 430H to select the desired register. The selected register is then read or written at port 431H for address bits A16-A23 and at port 432H for address bits A14 and A15 (LSB first). In clone mode and special clone mode the port addresses are assigned to match the standard address assignments used by IBM in its PC AT systems. They are 87H, 83H, 81H, 82H for byte channels 0 to 3, 8BH, 89H, 8AH for word channels 5-7 and 8FH for REFRESH.

It should be understood that the same address location within the page register 64×10 memory 118 is used for both the special clone mode, and the first register (first 16K block) for extended mode. However, a second DMA page register address is assigned to the register for extended mode so that the same memory location can be accessed by system I/O in two different ways. These register addresses are written into latch 130 to select the proper memory location within page register 118.

For extended mode channel 0 has four page registers at registers 07H, 17H, 27H and 37H. Channel 1 has four registers at 03H, 13H, 23H and 33H. Channel 2 has four registers at 01H, 11H, 21H and 31H. Channel 3 has four registers at 02H, 12H, 22H and 32H. Channel 5 has eight registers at 0BH, 1BH, 2BH, 3BH, 4BH, 5BH, 6BH and 7BH. Channel 6 has eight registers at 0AH, 1AH, 2AH, 3AH, 4AH, 5AH, 6AH and 7AH. For extended mode Refresh is addressable at register 0FH. The extended mode addresses are still written into the DMA address latch 130 at port address 430H.

During a DMA transfer I/O controller 18 outputs signals DAK4, ED1 and ED2 to select one of the DMA channels or Refresh. The selection codes are assigned as 000 for channel 3, 001 for channel 0, 010 for channel 1, 011 for channel 2, 100 for channel 7, 101 for REFRESH, 110 for channel 5 and 111 for channel 6.

Referring to FIG. 1 as well as FIG. 2, a spare readable and writeable register location in the keyboard controller has bit 0 designated as an external page register bit and generates an output signal -EN_PG_REG. Other storage locations could be used as well but this one happened to be available as a spare. Signal -EN_PG_REG goes inactive high to command mapped clone mode (or clone mode if mapping is not enabled) in which DMA addresses are conventionally generated by readable and writeable page registers within I/O controller 18 and the modification system 20 is masked from the DMA transfer mode. It thus operates as if a normal CPU memory access were in progress and translates the address as described below. To accomplish the masking, the normal ACK, IOW and IOR signals are modified by I/O controller 18 to produce signals XACK, XIOW and XIOR when -EN_PG_REG is high. In mapped clone mode gate 82 couples address signal DX14-DX16 to A14-A16 and gate 84 operates on the output signals to couple TA14-TA16 to XA14-XA16.

$$Signal-XACK = -(REFRESH + EN\_PG\_REG \cdot ACK) \quad (1)$$

This allows refresh to pass through to the modification system but blocks the ACK signal which indicates a DMA transfer is in progress unless signal -EN_PG_REG is active low.

The port read and write signals are blocked by the ACK signal to prevent an I/O space port access to modification system 20 while a DMA transfer is in progress. The relationships are, $$-XIOR = -(IOR \cdot -ACK) \quad (2)$$

$$-XIOW = -(IOW \cdot -ACK) \quad (3)$$

The DMA page register modes can be summarized according to the state of signal EN_PG_REG. If signal EN_PG_REG is inactive the I/O controller 18 operates conventionally to generate the upper address bits for each DMA address. If mapping is enabled by control register 108 a mapped clone mode is established and the DMA addresses are mapped along with other addresses. If mapping is not enabled a clone mode of operation emulates an IBM PC-AT computer.

If signal EN_PG_REG is active then generation of the upper address bits bu I/O controller 18 is inhibited, the upper address bits are generated by DMA page register 118 and all mapping of the DMA address is inhibited. If an active DMA channel is enabled by a corresponding bit in DMA mode register 114 then extended mode operation occurs with the 8 DMA page registers for each channel (4 for byte DMA channels) providing paging in 16K blocks. If a given channel is not enabled by the DMA mode register then operation proceeds in a special clone mode. Special clone mode is functionally the same as clone mode except the upper address bits are generated by a subset of the DMA page registers 118 having one register per DMA channel. This subset of registers is assigned the same conventional I/O port addresses as the conventional page registers in I/O controller 18 and thus stores the same data so that functionally system operation is the same as in clone mode.

In the mapped clone mode DMA addresses are generated as in the IBM PC-AT computer. The conventional page registers within the I/O controller 18 supply address bits A16-A23 (A17-A23 for word transfers) on bus 60 to the computer address modification system 20. Address signals A14-A15 (A14-A16 for word transfers) are transferred by the active DMA controller over local I/O bus 48 to latch 76. From latch 76 they are transferred through bus 80, gate 82 and bus 60 to computer address modification system 20. Address signals A0-A7 (A1-A8 for word transfers) are supplied by the active DMA controller 50 to XA bus 72. Address signals A8-A13 (A9-A13 for word transfers) are supplied by the active DMA controller 50 over bus 48 to latch 76 and then to bus 72.

The computer address modification system 20 then translates the supplied DMA address as if it were a CPU supplied address. Upper address signals TA14–TA23 are output to bus 64 and made available to gates 62 and 66. Signals TA14–TA16 are also coupled through gate 84 and bus 86 to positions XA14–XA16 on XA bus 72. They are thus made available at gate 70 along with signals A0–A13 on lines XA0–XA13.

When internal paging is activated by assertion of signal -EN_PG_REG active low the DMA mode register determines separately for each channel whether operation occurs in a special clone mode or an extended mode. The channel selection—signals DAK4, ED1 and ED2 are coupled as selection inputs to an 8:1 multiplexer which receives the outputs from the DMA mode register 114. The selected multiplexer output signal determines whether special clone mode or extended mode is in effect for the currently selected channel. For refresh clone mode is always input to the multiplexer.

In both special clone mode and extended mode the computer address modification system responds to a DMA access by supplying upper level address signals obtained from DMA page register 118. The generated DMA address signals are not further mapped. Signals XA0–XA13 (XA1–XA13 for word transfers) are placed on XA bus 72 by the DMA controller 50 and are not changed by computer address modification system 20. In special clone mode upper address signals TA1-6–TA23 (TA17–TA23 for word transfers) are provided by a selected DMA page register 118. In extended mode upper address signals XA14–XA16 and TA17–TA23 are provided by the DMA page register 118.

The middle bits are handled differently for clone mode special and extended mode. In special clone mode signals DX14–DX15 (DX14–DX16 for word transfers) are passed through to outputs XA14–XA15 (XA14–XA16 for word transfers) on XA bus sections 86 and 72. In extended mode address signals DX14–DX15 (DX14–DX16 for word transfers) are used to select one of four (one of 8 for word transfers) DMA page registers 118 which corresponds to an indicated 16K page for the currently active DMA channel. Gates 82 and 84 block transfer of the middle bits during both modes of operation.

To address 64×10 RAM within DMA register 118 during DMA operation the channel selection signals DAK4, ED1 and ED2 provide 3 of the required 6 address bits and received address bits DX14–DX16 provide the other three bits (DX14–DX15 for a byte DMA). Signals DX14–DX16 are gated by signal EXP_REG_EN (see FIG. 5) to outputs XA14–XA16 only in special clone mode with page register signals PA14–PA16 being gated out for extended mode. Signal DX16 is further gated by signals DAK4 to be effective only for a word transfer.

When I/O controller 18 generates signal XACK to acknowledge a DMA request, if signal EN_PG_REG is inactive it also asserts address signals A17–A23 (A16–A23 for byte transfers) which are communicated through multiplexer 116 (FIG. 3) to TA17–TA23 (TA16–TA17 for byte transfers). The DMA controller 50 places on DMA address bus 72 signals XA0–XA7 for a byte transfer and XA1–XA8 for a word transfer (bit 0 is an implied 0). Signals A8–A15 (A9–A16 for a word transfer) are placed on the XD data bus 48 and held by latch 76 for presentation to buses 72 and 80.

Latch 76 places on the XA Bus 72, signals XA8–XA13 for a byte DMA and XA9–XA13 for a word DMA. The latch 76 also communicates signals 14, 15 (and 16 for a word DMA) over DX bus 80 to modification system 20. In clone mode and special clone mode bits DX14 and DX15 (DX14–DX16 for word transfers) are passed through to XA14 and XA15 (XA14–XA16 for word transfers). Bit zero of the first page register of the selected channel drives output XA16 for byte transfers. These signals are coupled through gate 70 to system bus 74 along with signals XA0–XA13. Signals A17–A23 are output from the selected DMA page register as signals TA17–TA23 and coupled through gate 66 to LA bus 68. In extended mode, the modification system uses address inputs XA14, XA15 (plus XA16 if a word transfer) to select one of the four registers associated with each channel (8 for word channels) to read the 10 most significant bits from the selected page register. These are output as XA4–XA16 and TA17–TA23.

An address latch 132 latches each successive input address signal A0 to A15 to hold the signal for decoding or—logic processing. It does not contribute to control of significant data flow.

Figure 4:
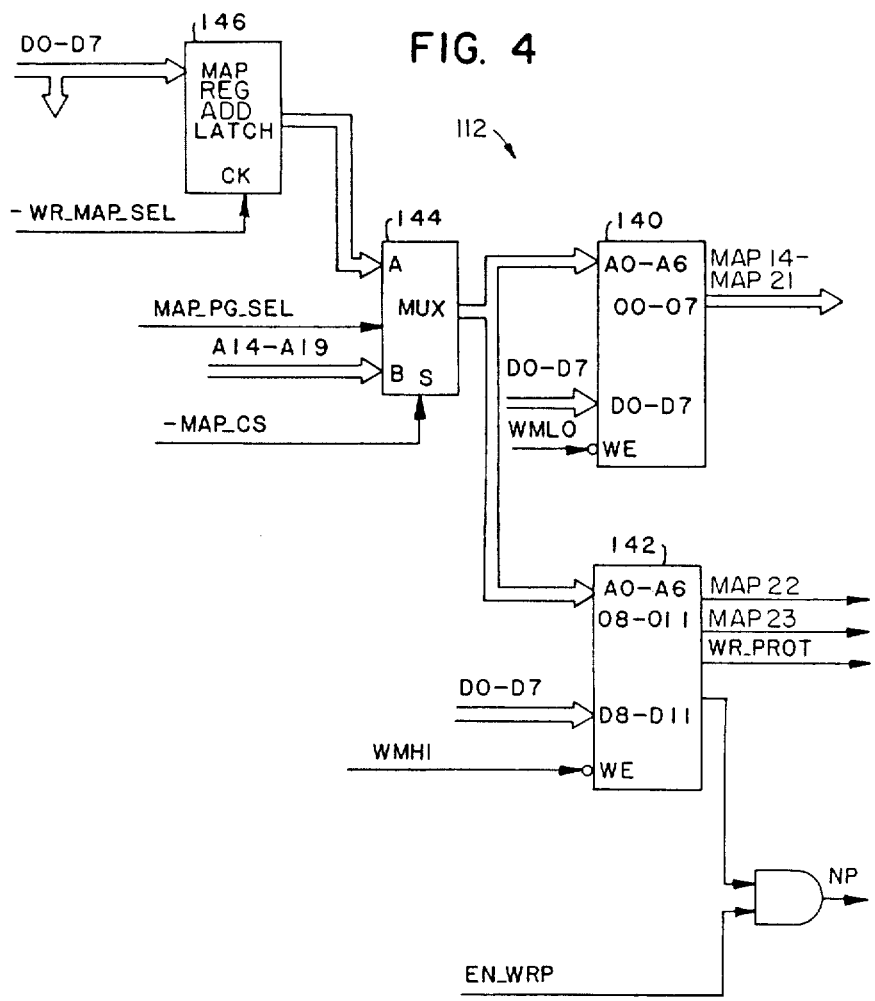
FIG. 4 is a block diagram representation of a mapper ram used in the computer address modification system shown in FIG. 2.

The mapper RAM 112 is shown in greater detail in FIG. 4 and includes two memory sections 140, 142. Memory section 140 is 128×8 and section 142 is 128×4 to provide a total capacity of 128×12. The address inputs are provided by a multiplexer 144 having A inputs connected to the output of an address latch 146 and B inputs connected to a signal MAP_PG_SEL and input address signals A14–A19. Signal MAP_PG_SEL is driven by bit 3 of the control register 108. This enables environment swapping between the upper and lower bank of 64 registers merely by changing one bit in the control register 108. The 6 least significant B inputs receive input address signals A14–A19.

To read or write mapper RAM 140, 142 the desired address 0–127 is first written into address latch 146 by making an I/O space write at port address 440H. Sequence and control logic decodes the port address and responds to the I/O signal and XIOW signal to generate latching signal -WR_MAP_SEL when all required conditions are met. This loads data from input data bus 102 into address latch 146.

Next the RAM 112 itself is addressed at port 441H for low module 140 and address 442H for high module 142. If one of these ports is properly decoded signal -MAP_CS is generated to pass the contents of address latch 146 to the address inputs of RAM modules 140, 142. If writing, the write map signal WMLO or WMHI is generated to load the input data bus 102 signals into the selected address location. If reading, the output of the selected location is gated onto the output data bus 104 through gating circuits that are not explicitly shown.

During normal memory access operation, multiplexer 144 passes signal MAP_PG_SEL and address signals SA14–SA19 to the address inputs of RAM modules 140, 142. The mapped translated addresses MTA 14 to MTA 23 are coupled to bus multiplexer 116 (FIG. 3). Signals MTA14–MTA16 are communicated to sequence and control logic 106 for use in generating signals XA14–XA16.

The write protect signal WR_PROT is also communicated to sequence and control logic 106 to inhibit generation of the output write signal XGMW when signal WR-PROT is active high. The not present memory output is ANDed with a signal enable write protect EN—WRP that is generated when the modification system 20 is active. The resulting NP signal is provided as an output but is not used in the present configuration.

Figure 5:
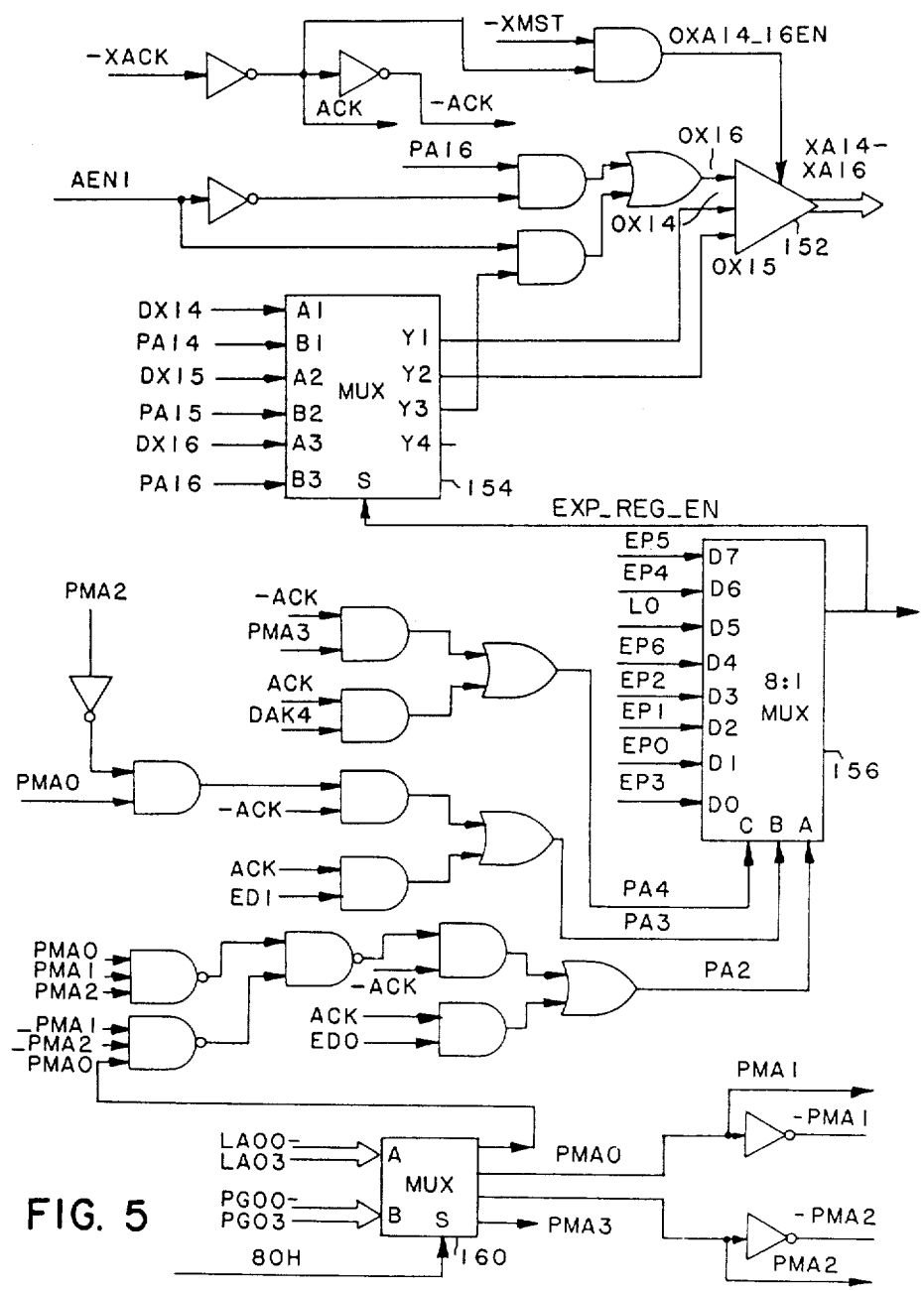
FIG. 5 is a block diagram representation of the logic within the computer address conditioning system shown in FIG. 2 for generating certain output address signals.
Figure 6:
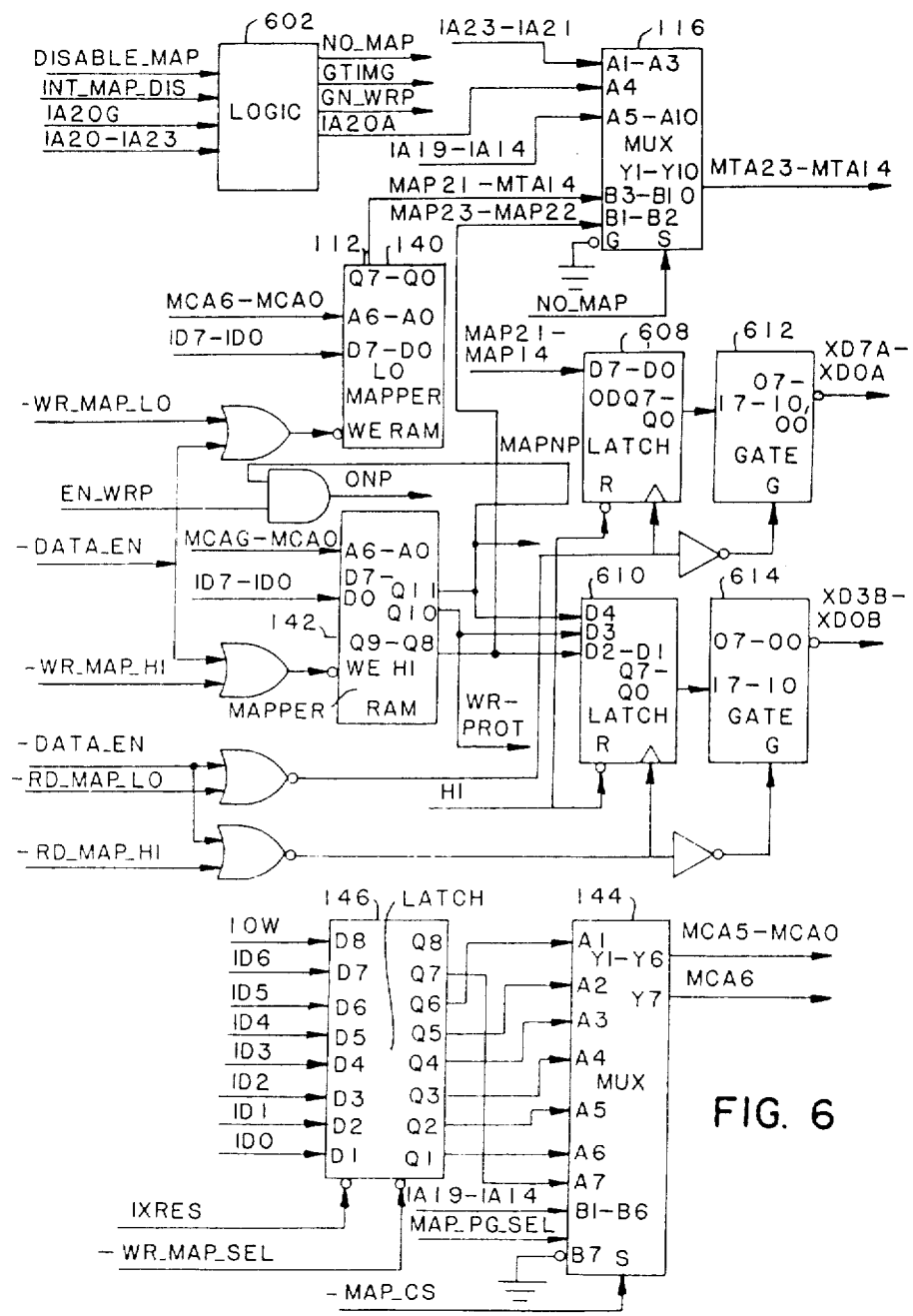
Figure 7:
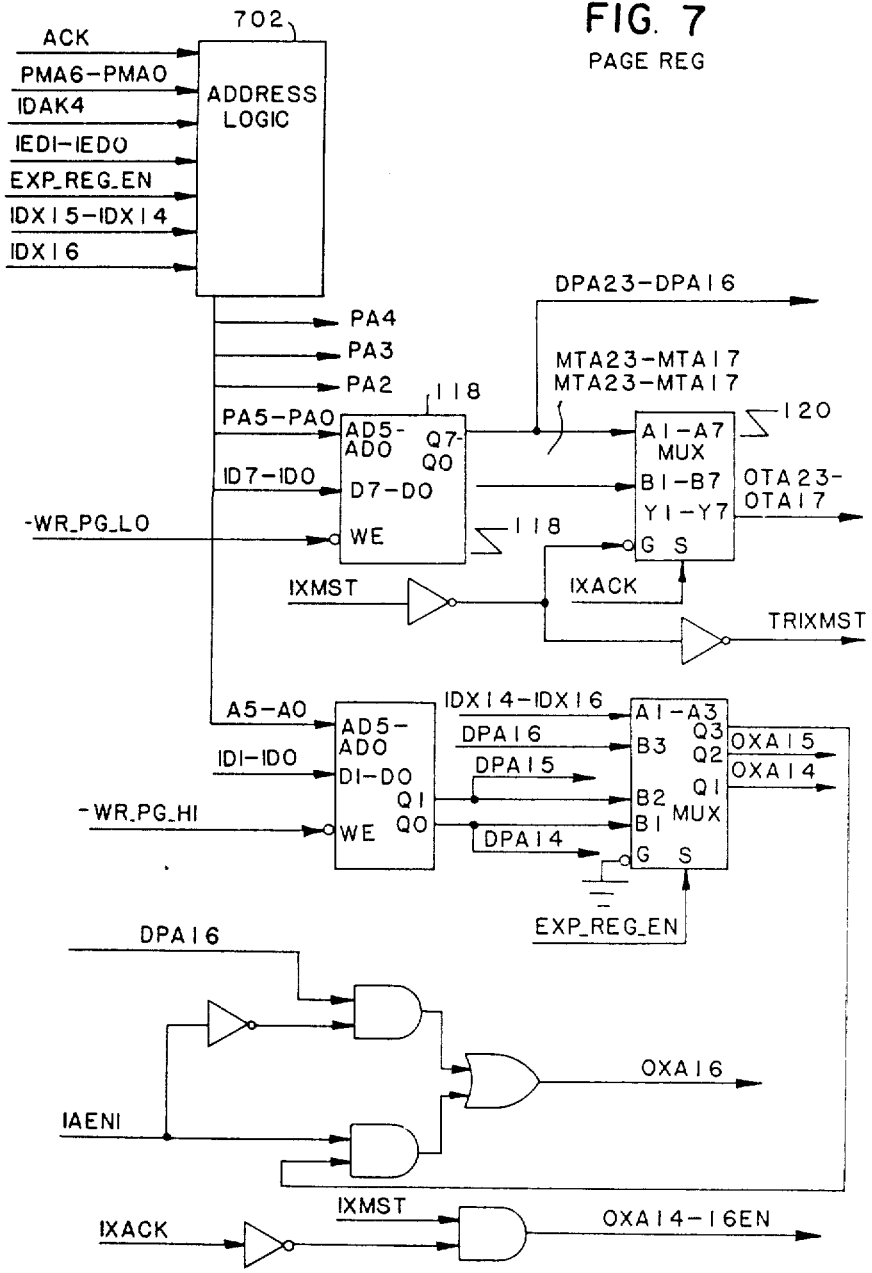
Figure 8:
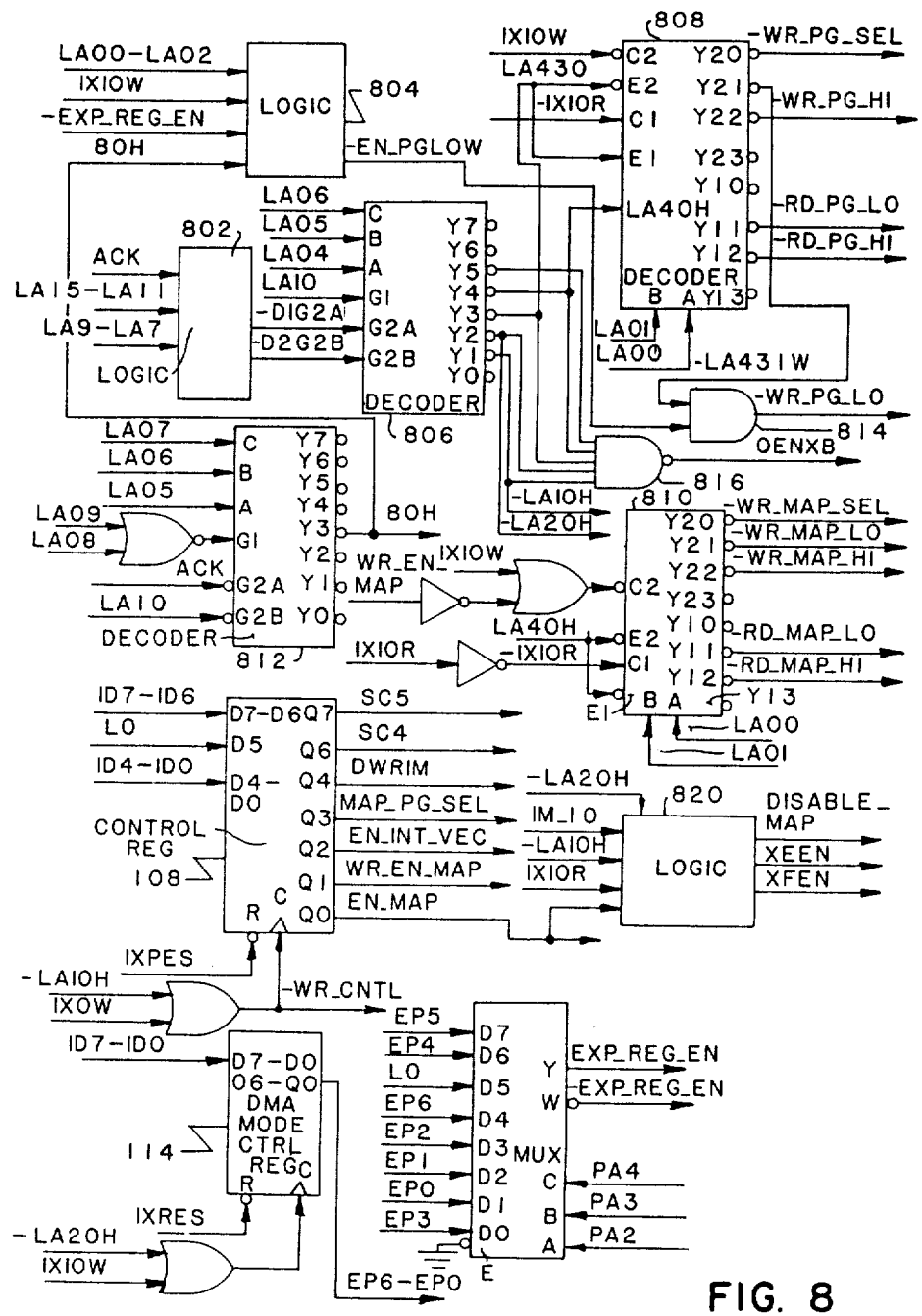
Figure 9:
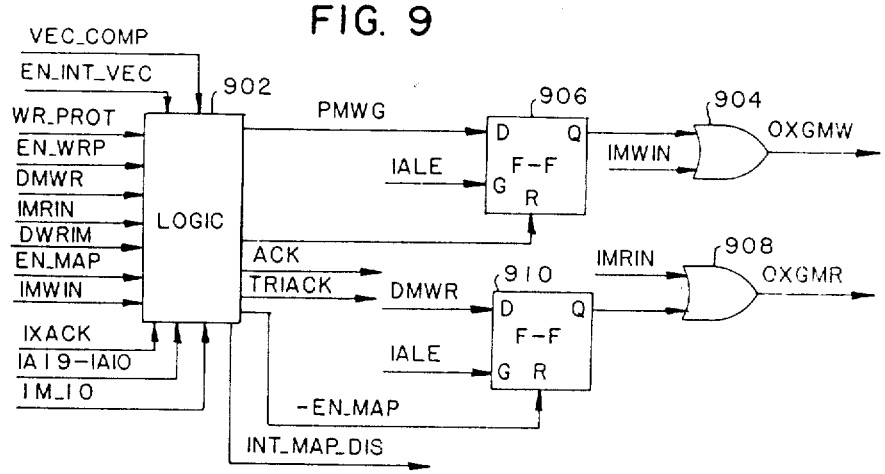
Figure 10:
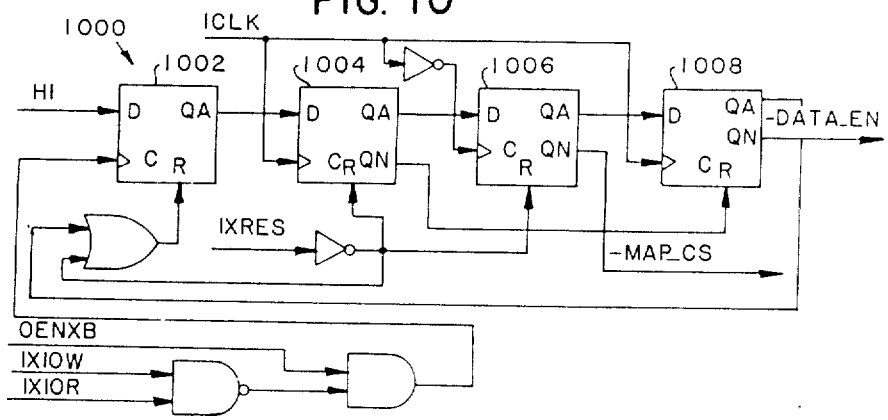
Figure 11:
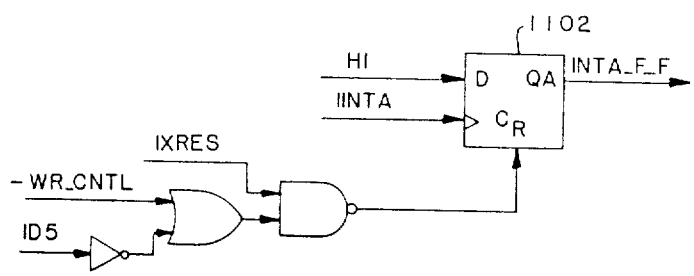
Figure 12:
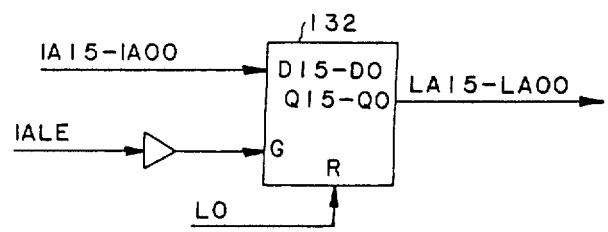
Figure 13:
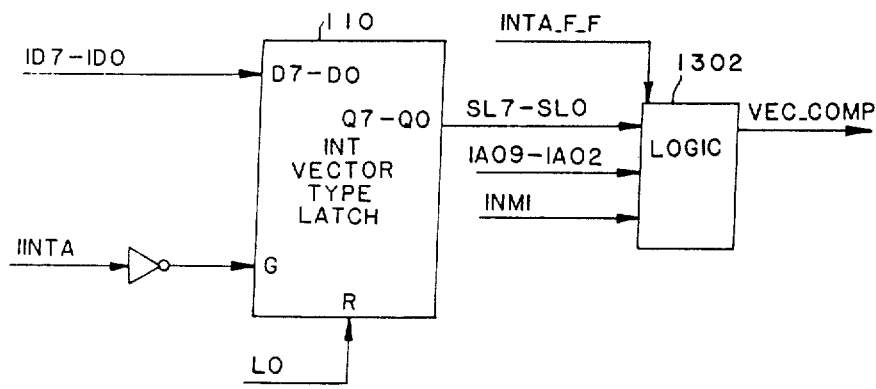
Figure 14:
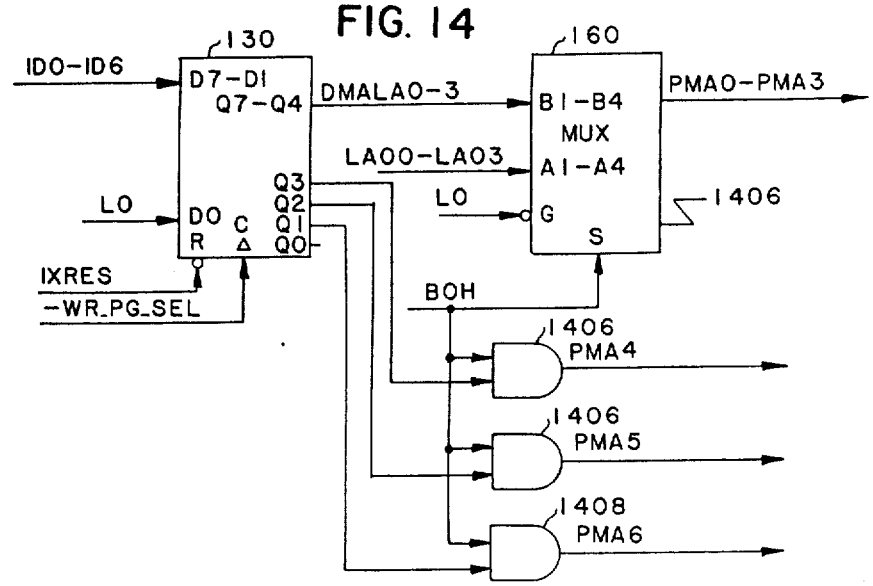
Figure 15:
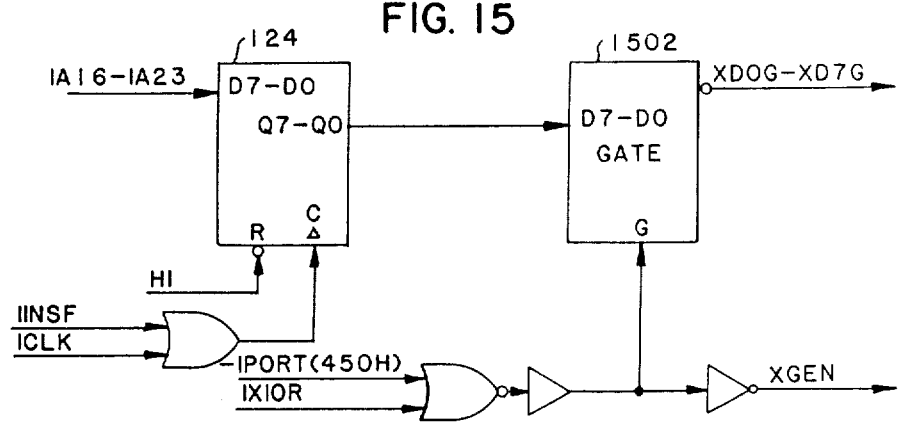
Figure 16:
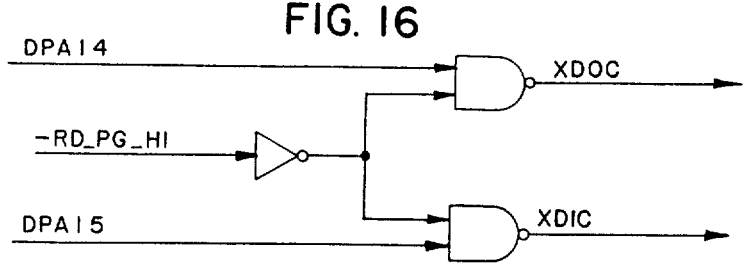
Figures 17, 18:
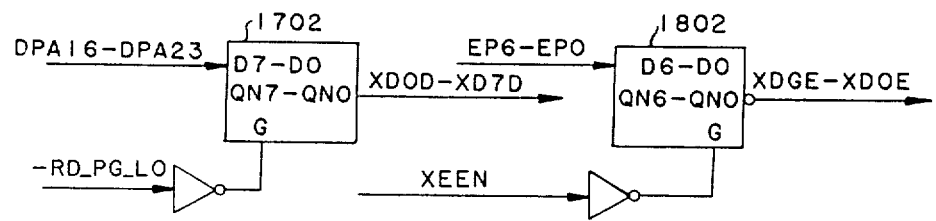
Figure 19:
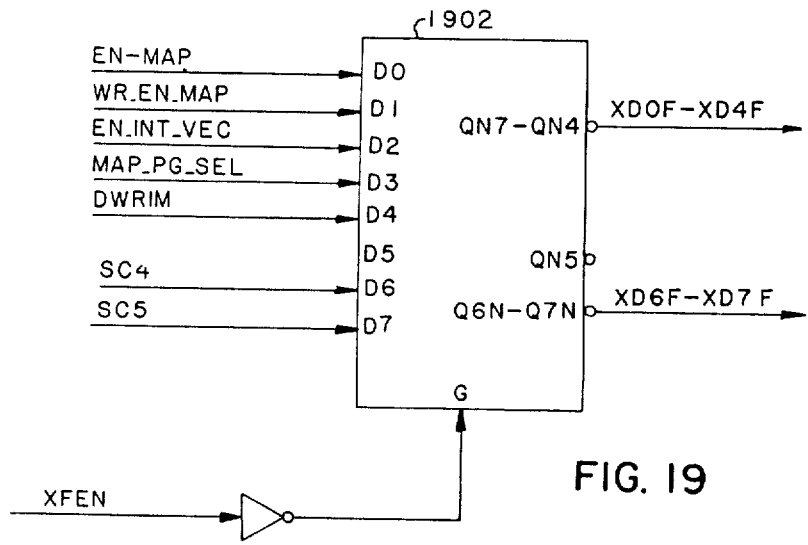
Figure 20:
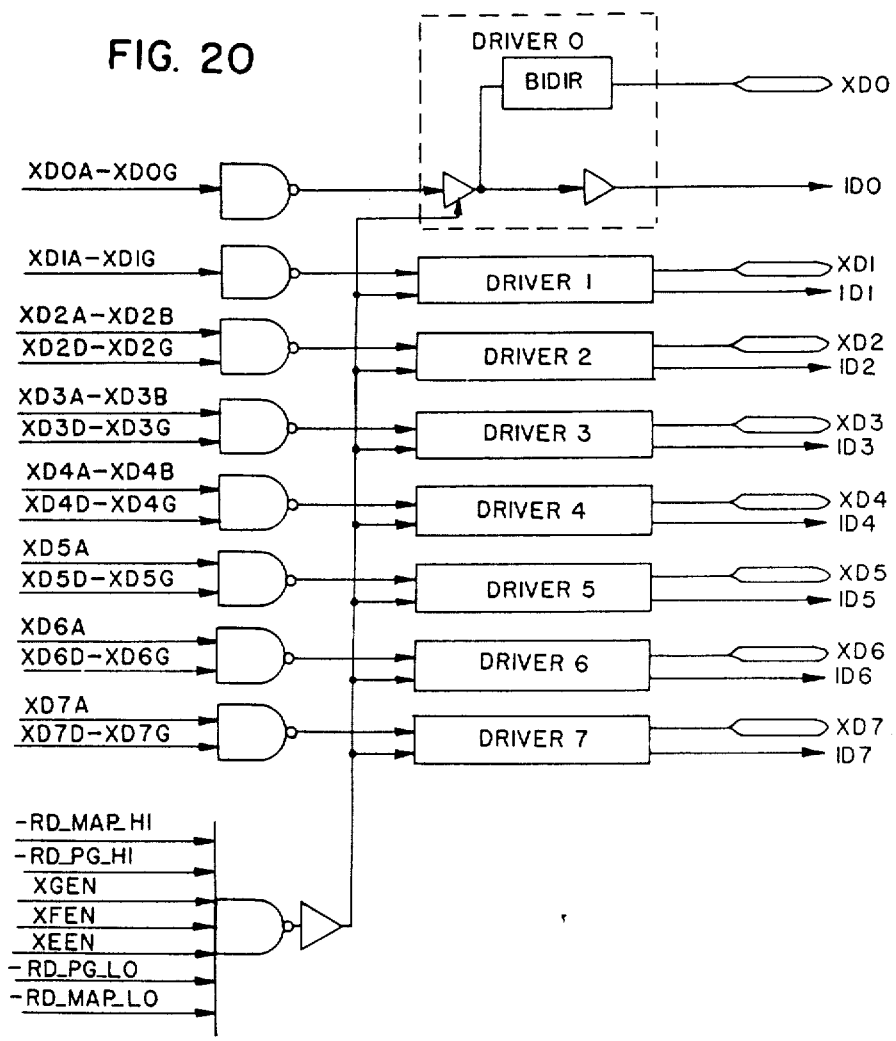

The generation of signals XA14–XA16 is complicated by the DMA transfers and is therefore shown in greater detail in FIG. 5. A translate output buffer 152 gates the signals out when ACK is high to indicate that a DMA transfer is in progress and signal -XMST is inactive high to indicate that and extended bus (not used in this implementation) is not in control.

If address input AEN1 from DMA channel 1 is low page register 118 data output PA16 automatically sources signal XA16. If high, XA16 is driven along with XA14 and XA15 by the output of a multiplexer 154. MUX 154 receives input data signals DX14–DX16 as A inputs and page register 118 data signals PA14–PA16 as B inputs. The select input to MUX 154 is driven by a signal EXP_REG_EN which is taken from an 8:1 MUX 156 to indicate whether or not extended mode is fully enabled for the active DMA channel. It receives 7EP inputs from the DMA mode register 114.

The three selector inputs PA4–PA2 are determined in response to decoding of the acknowledge/signal ACK, DMA channel address signals DAK4, ED1 and ED0 and page memory address signals PA0–PA3.

Signals PMA0–PMA3 are generated by a MUX 160 which receives as A inputs signals LA00–LA03 from address latch 132 and as B inputs signals PG0–PG3 from the DMA address latch 130. MUX 160 a input is selected by signal 80H which goes active when ACK is low while address latch 132 signal LA7 is high and LA5, LA6, LA8, LA9, and LA10 are low. Signal 80H thus indicates that one of the standard page register port addresses between 80H and 9FH is being accessed.

While there has been shown and described above a particular arrangement of a computer system in accordance with the invention, it will be appreciated that the invention is not limited thereto. Accordingly, any modifications, variations or equivalent arrangements within the scope of the attached claims should be considered to be within the scope of the invention.

What is claimed:

1. A computer comprising:
a central processing unit;
a computer address modification system receiving memory address signals, DMA channel selection signals and memory address signals and selectively outputting translated memory address signals and DMA page address signals in response thereto:
a CPU address bus coupled to the central processing unit, to the computer address modification system and through a first gate to a system address bus;
a main memory;
a DMA controller that is operates during a DMA cycle to provide a plurality of direct memory access address signals;
an interrupt controller;
a system address bus providing addresses to the main memory;
a DMA address bus coupled to receive address signals from the DMA controller, the DMA address bus being coupled through a second gate to the system address bus and to an output for a plurality of address signals from the computer address modification system which correspond to a most significant plurality of the address signals from the DMA controller;
a local I/O bus coupled to communicate information with I/O devices including the DMA controller and the interrupt controller and with the computer address modification system;
a system data bus coupled to the main memory;
a CPU data bus coupled to communicate data with the central processing unit and with the computer address modification system;
a third gate coupling the CPU data bus to the system data bus;
a fourth gate coupling the system data bus to the local I/O bus;
a latch coupled to receive and store data from the local I/O bus including address signals which correspond to said most significant plurality of the address signals from the DMA controller;
a DMA extension bus coupled to transfer the address signals stored by the latch which correspond to said most significant plurality of the address signals from the DMA controller to the computer address modification system;
a fifth gate coupling the DMA extension bus to corresponding signals on the CPU address bus;
a translated address bus receiving translated address signals from the computer address modification system and coupling the translated address signals to the main memory;
a sixth gate coupling signals from the translated address bus which correspond to said most significant plurality of the address signals from the DMA controller to corresponding signals of the DMA address bus; and
a seventh gate coupling the translated address bus to the system address bus.

2. A computer system comprising:
a central processing unit having address and data terminals;
a data store storing information including instructions that are executable by the central processing unit, the data store being addressable in response to first, second and third groups of encoded address signals;
a DMA controller circuit providing address signals comprising the first and second groups during a direct memory access operation;
a DMA address latch coupled to receive and store the second group of address signals and a portion of the first group of address signals;
a DMA address bus coupled to receive the first and second groups of address signals provided by the DMA controller circuit and communicate the first and second groups of address signals to the data store;
an input/output controller generating the third group of address signals during a direct memory access operation;
a DMA extension bus coupled to receive the second group of address signals from the DMA address latch during a direct memory access operation;
a CPU address bus coupled to receive the first, second and third groups of address signals from the central processing unit during a central processing unit operation and to receive the third group of address signals form the input/output controller during a direct memory access operation;
a first writeable register storing a map enable signals indicating whether or not translation of address signals appearing on a CPU address bus is enabled;

a second writeable register storing a page enable signal indicating whether or not paging of DMA addresses during a direct memory access operation is enabled;

a first gate that operates during a direct memory access operation when the page enable signal indicates that paging of DMA addresses during a direct memory access operation is not enabled to couple the second group of address signals from the DMA extension bus to the CPU address bus;

a translated address bus communicating the second and third groups of addresses to the data store;

a second gate that operates during a direct memory access operation when the page enable signal indicates that paging of DMA addresses during a direct memory access operation is not enabled to couple the second group of signals from the translated address bus to the DMA address bus;

a computer address modification system receiving first, second and third groups of addresses at address input terminals from a CPU address bus, receiving data at data input terminals, receiving the second group of address signals from the DMA extension bus during a direct memory access operation, and receiving direct memory access channel identification information at DMA channel identification input terminals, the computer address modification system including a mapping store storing a plurality of translation addresses and a page store storing a plurality of direct memory access page addresses, the computer address modification system selectively transferring an address received from the CPU bus or a translated address to the translation address bus in accordance with a state of the map enable signal with translation being inhibited during a direct memory access operation when the page enable signal enables paging; and a data bus circuit providing communication of data information among the central processing unit data terminals, the data store and the address modification system data input terminals.

3. A computer system according to claim 2 further comprising an interrupt controller generating an interrupt request upon an occurrence of an interrupt and placing an interrupt vector type upon the data bus circuit upon acknowledgement of an interrupt request by the central processing unit, the computer address modification system including an interrupt detection circuit inhibiting translation of received address signals while an interrupt response routine is being processed.

* * * * *

UNITED STATES PATENT AND TRADEMARK OFFICE
CERTIFICATE OF CORRECTION

PATENT NO. : 4,891,752
DATED : January 2, 1990
INVENTOR(S) : Bruce A. Fairman, et al.

It is certified that error appears in the above-identified patent and that said Letters Patent is hereby corrected as shown below:

In the drawings, delete sheets 6-13 (Figs. 6-20).

Signed and Sealed this

Twenty-sixth Day of March, 1991

Attest:

HARRY F. MANBECK, JR.

Attesting Officer

Commissioner of Patents and Trademarks